US006812848B2

(12) United States Patent
Candela

(10) Patent No.: US 6,812,848 B2
(45) Date of Patent: Nov. 2, 2004

(54) WATER LEAK MITIGATION SYSTEM

(75) Inventor: Paul Joseph Candela, Clinton Township, MI (US)

(73) Assignee: Flo-Guard Water Leak Mitigation Systems, LLC, Clinton Township, MI (US)

( * ) Notice: Subject to any disclaimer, the term of this patent is extended or adjusted under 35 U.S.C. 154(b) by 0 days.

(21) Appl. No.: 10/216,984

(22) Filed: Aug. 12, 2002

(65) Prior Publication Data

US 2004/0036615 A1 Feb. 26, 2004

(51) Int. Cl.$^7$ .............................................. G08B 21/00
(52) U.S. Cl. ...................... 340/605; 340/603; 340/606; 137/79
(58) Field of Search ................................ 340/605, 603, 340/606; 137/79, 15.11, 78.3, 624.12; 73/40

(56) References Cited

U.S. PATENT DOCUMENTS

| 4,730,637 A | | 3/1988 | White ........................ 137/62 |
| 4,841,287 A | | 6/1989 | Flig et al. ................ 119/14.08 |
| 4,921,012 A | * | 5/1990 | Bratten ....................... 137/599 |
| 4,987,408 A | | 1/1991 | Barron ....................... 340/604 |
| 5,038,820 A | * | 8/1991 | Ames et al. ................ 137/486 |
| 5,086,385 A | | 2/1992 | Launey et al. .............. 364/188 |
| 5,229,750 A | | 7/1993 | Welch, Jr. et al. .......... 340/605 |
| 5,263,543 A | * | 11/1993 | Nigro ......................... 169/56 |
| 5,267,587 A | * | 12/1993 | Brown .................. 137/624.12 |
| 5,331,619 A | | 7/1994 | Barnum et al. ............. 364/132 |
| 5,428,347 A | | 6/1995 | Barron ........................ 340/604 |
| 5,541,575 A | | 7/1996 | Virnich ....................... 340/506 |
| 5,568,825 A | | 10/1996 | Faulk ..................... 137/624.11 |
| 5,655,561 A | | 8/1997 | Wendel et al. ................ 137/79 |
| 5,662,135 A | * | 9/1997 | Oppmann et al. ............. 137/1 |
| 5,971,011 A | * | 10/1999 | Price .......................... 137/460 |
| 6,039,124 A | * | 3/2000 | Bowman et al. .............. 169/61 |
| 6,059,439 A | | 5/2000 | Besnard ...................... 364/138 |
| 6,105,607 A | | 8/2000 | Caise et al. .............. 137/487.5 |
| 6,144,993 A | | 11/2000 | Fukunaga et al. .......... 709/208 |
| 6,147,613 A | | 11/2000 | Doumit ...................... 340/605 |
| 6,192,282 B1 | | 2/2001 | Smith et al. .................. 700/19 |
| 6,237,618 B1 | * | 5/2001 | Kushner ........................ 137/1 |

* cited by examiner

Primary Examiner—Benjamin C. Lee
Assistant Examiner—Phung Nguyen
(74) Attorney, Agent, or Firm—Harness, Dickey & Pierce, P.L.C.

(57) ABSTRACT

A water leak mitigation device comprising a power supply, a building systems interface, a plumbing interface, and a monitoring device is provided. The monitoring device produces a primary input to the building systems interface. Upon receipt of the primary input, the building systems interface instructs the plumbing interface to restrict water flow to the associated building. Upon receipt of a secondary input produced by a building device when the building device requires water for operation, the building systems interface instructs the plumbing interface to resume the flow of water to the building so as to permit the operation of the building device. After the building device has completed its operation, transmission of the secondary input ceases and the building systems interface instructs the plumbing interface to again restrict the flow of water to the building.

19 Claims, 2 Drawing Sheets

WATER LEAK MITIGATION SYSTEM

FIELD OF THE INVENTION

The present invention relates to a control device capable of controlling the flow of a liquid. In particular, the present invention relates to a control device capable of both restricting water flow to a building in response to a primary input generated by one or more systems or devices that do not require water for operation and interrupting the water flow restriction in response to a secondary input produced by one or more important building devices that do require water for operation.

BACKGROUND OF THE INVENTION

Water leak detection and control devices capable of restricting water flow to a building in response to the detection of a particular condition, such as one or more water leaks, are known. Current water leak detection and control devices actively detect the presence of water leaks directly by sensing different water parameters or indirectly by monitoring the associated water system. Such detection devices actively sense water parameters or monitor the associated water system through the use of electronic, mechanical and/or electro-mechanical circuits, such as sensors, microprocessors, and drivers. The use of such active monitoring devices makes current water leak detection devices inherently complex and costly. Due to the complexity and cost of current water leak detection devices, their use is impractical in many applications. Moreover, these systems are limited either in the ability to provide protection of the entire building, and/or in the ability to provide water flow for important building systems in the event of a water leak(s). Thus, there is a need for a water leak detection device that provides complete protection, is capable of reducing the possibility of water leaks, and enables water flow to important building systems without the use of costly and complex active monitoring devices.

In response to the detection of a water leak, current water leak detection devices entirely restrict water flow to the associated building. Consequently, important building operations that require water to function become inoperable. Examples of important building devices that require water to function include irrigation systems, sump pumps, baseboard heating systems, water softener systems, and fire suppression systems. When these important building devices are not operational, the building is negatively affected. Thus, there exists a need in the art for a device that restricts water flow when water is not needed but resumes water flow when water is needed for operation of an important building device.

SUMMARY OF THE INVENTION

The present invention overcomes the prior art deficiencies by providing a water leak mitigation system comprising a power supply, a building systems interface, a plumbing interface such as a water control valve, and pre-existing switching devices. Primary switching devices produce primary inputs to the building systems interface in response to the need to restrict water flow such as when the building is vacated for long durations. Upon receipt of the primary input, the building systems interface instructs the water control valve to restrict water flow to the associated building. The flow of water to the building remains restricted unless the building systems interface receives a secondary input, produced by a secondary switch device associated with an important building device, that requires water to function. Upon receipt of the secondary input, the building systems interface instructs the water control valve to resume the flow of water to the building so as to permit operation of the important building device. After the important building device has completed its operation, transmission of the secondary input ceases and the building systems interface instructs the water control valve to again restrict the flow of water to the building. Thus, the present invention is capable of reducing the possibility of water leaks and the resulting water damage that may occur.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
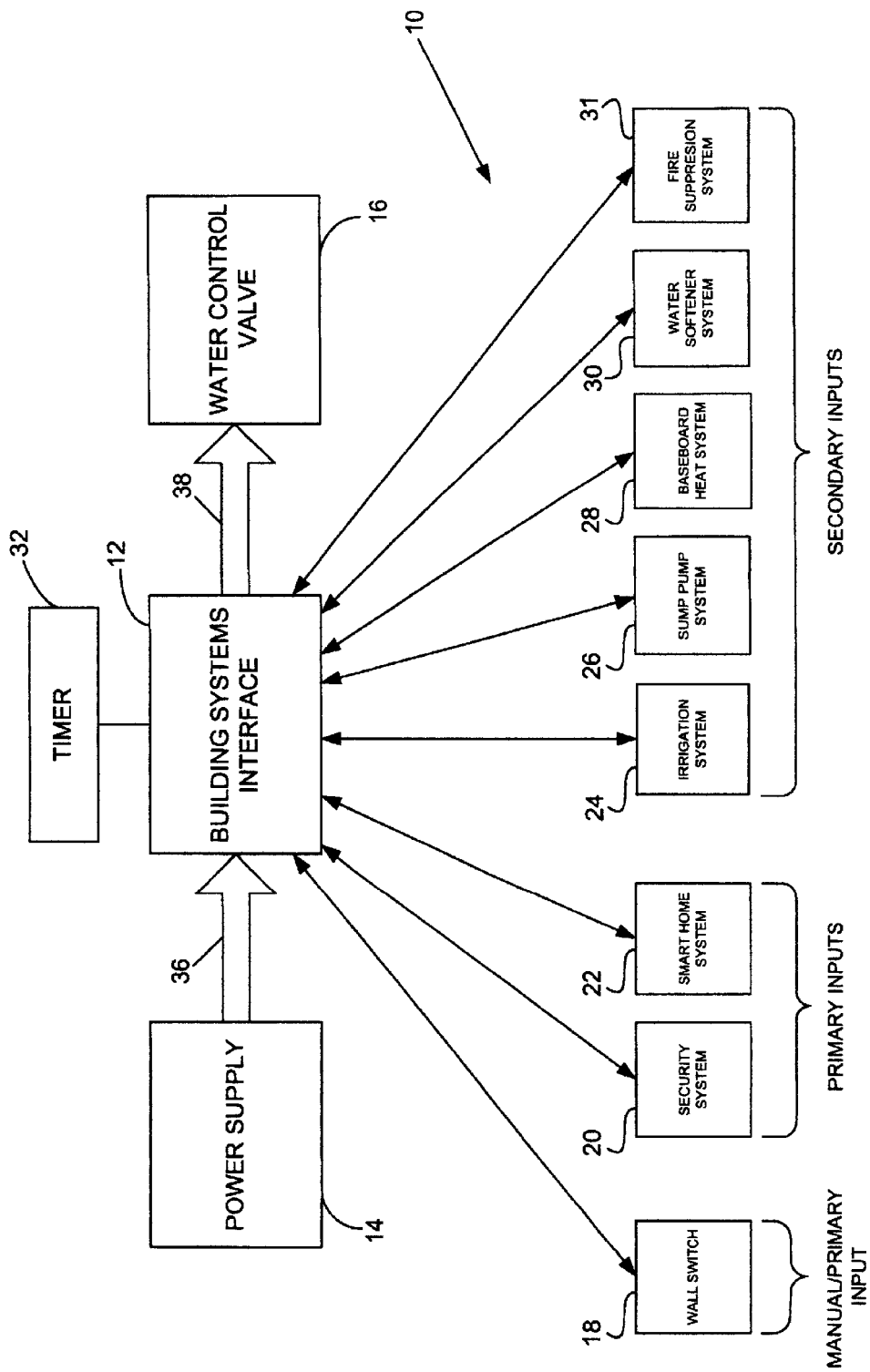
FIG. 1 is a system block diagram showing the general components of the invention, the invention providing a building systems interface, a power supply, a water control valve, a manual primary input, primary inputs, and secondary inputs.

With reference to FIG. 1, a system for mitigating water leaks is shown at 10. Specifically, the system 10 prevents the flow of water to a building when a particular condition is detected, but resumes water flow when necessary to operate important water dependent building systems. The system 10 is generally comprised of a building systems interface 12, a power supply 14, and a plumbing interface, such as water control valve 16. The components of system 10 are preferably, but not required to be, located within a building (not shown) so as to optimize installation and function and are preferably connected through wiring according to appropriate specifications to meet local building codes. The interface 12, power supply 14, and water control valve 16 may be sized to the specifics of the particular application. The three main components of system 10 are described in detail below.

The building systems interface 12 provides passive control of water flow to prevent unwanted water leaks. The control is passive in that the systems interface 12 does not monitor water parameters, such as water, water flow, water pressure, etc. Instead, the systems interface 12 provides a connection to numerous building systems that actively or intentionally control water flow.

The building systems interface 12 provides all electrical inputs and outputs for system 10. Systems interface 12 includes an input array for interface to external inputs such as, but not limited to, a manual wall switch 18, a security system 20, a smart home system 22, an irrigation system 24, a drainage/sump pump 26, a baseboard heating system 28, a water softener system 30, and a fire suppression system 31. Inputs generated by monitoring devices, such as security system 20 and smart home system 22, are generally classified as primary inputs. Inputs generated by important water dependent building systems, such as irrigation system 24, drainage/sump pump 26, baseboard heating system 28, water softener system 30, and fire suppression system 31 are generally classified as secondary inputs. Inputs generated by manual switch 18 may be classified as either manual inputs or primary inputs depending upon the particular application. It must be understood that the inputs received by systems interface 12 may include any one or all of the inputs described above. Further, additional inputs may be added at any time after assembly of system 10.

Systems interface 12 further includes an adjustable timer 32 to delay activation of the water control valve 16, a bypass 34 to deactivate the water control valve 16 (FIG. 2), an input array 36 for the power supply 14 and primary and secondary inputs, an output array 38 for interface to the water control valve 16, an enclosure (not shown), a visual annunciation of the active inputs and outputs in the form of a suitable annunciation device such as LEDs 42, 43, 44 (FIG. 2), and mounting provisions (not shown).

Power supply 14 may be any suitable power supply capable of powering water control valve 16 and building systems interface 12. The transfer of voltage from the power supply 14 to water control valve 16 is controlled by systems interface 12 based on the primary, secondary, or manual inputs that interface 12 receives from the above described devices 18 through 31. Interface 12 also directs voltage produced by power supply 14 to external devices for feedback as inputs, as the result of the closure of switch or relay contacts.

Water control valve 16 preferably includes a water hammer arrestor (not shown). The water control valve 16 and the water hammer arrestor are sized to the specifics of the application. The water control valve 16 and the water hammer arrestor are preferably located adjacent and posterior to a building water meter (not shown). Preferably, when the water control valve 16 is not energized, the valve 16 remains open so as to permit water flow to the building. When the water control valve 16 is energized, the valve 16 closes and prevents water flow to the building. However, it must be noted that this configuration may be reversed so that when the plumbing interface 16 is not energized the valve 16 is closed, thus arresting water flow to the building.

Operation of system 10 will now be described in detail below. System 10 may be operated manually using wall switch 18. Operation of switch 18 transfers a manual input to systems interface 12. Upon receipt of the manual input, systems interface 12 directs voltage from power supply 14 to water control valve 16 so as to energize and close valve 16. The closure of valve 16 prevents water flow to the associated building. As long as system 10 is in receipt of the manual input generated by wall switch 18, the valve 16 will remain energized and water will be prevented from flowing to the building. However, if systems interface 12 receives a secondary input from an important peripheral system or building device, such as irrigation system 24, sump pump 26, baseboard heating system 28, water softener system 30, or fire suppression system 31, the water control valve 16 will be de-energized and valve 16 will open to permit water flow to the building so as to permit operation of important peripheral systems such as those described above. Thus, the manual function provides a simple, low cost building interface. As described above, the manual switch may also be used as a primary input if so desired.

In addition to manually operating water control valve 16 using wall switch 18, the water control valve 16 may be automatically operated by systems interface 12 in response to primary inputs generated by one or more suitable active switching devices such as security system 20 or smart home system 22. For example, once smart home system 22 or security system 20 are placed in the "away" mode, such as when the building is vacated for extended periods of time, the respective devices 20, 22 send a primary input to systems interface 12 notifying the interface 12 of the condition. Interface 12 then transfers voltage from power supply 14 to water control valve 16 so as to close valve 16 and prevent water flow to the associated building. Valve 16 remains closed as long as the primary input is received and a secondary input from important building devices 24 through 31 is not.

Timer 32 may be used to delay the closure of valve 16 in response to the receipt of a primary input by systems interface 12. The use of timer 32 allows water to flow to the building for a set period of time before the water flow is restricted by systems interface 12. The timer 32 may be set by the user to any suitable time period. Use of timer 32 is advantageous as it permits water flow immediately following departure of the user from the building for such events as laundry, dishwashing, etc.

Water flow previously interrupted due to the receipt of a primary input by systems interface 12 is restored upon the receipt of a secondary input by systems interface 12. For example, if an important water dependent building peripheral system requires activation, such as irrigation system 24, sump pump 26, baseboard system 28, water softener system 30 and/or fire suppression system 31, the water dependent device sends a secondary input to systems interface 12. Upon receipt of the secondary input, systems interface 12 activates bypass 34 so as to de-energize the water control valve 16, thereby permitting water flow to the building. The water control valve 16 remains de-energized until the secondary input is eliminated. Once the secondary input is eliminated, water flow is again interrupted unless another secondary input is received.

Figure 2:
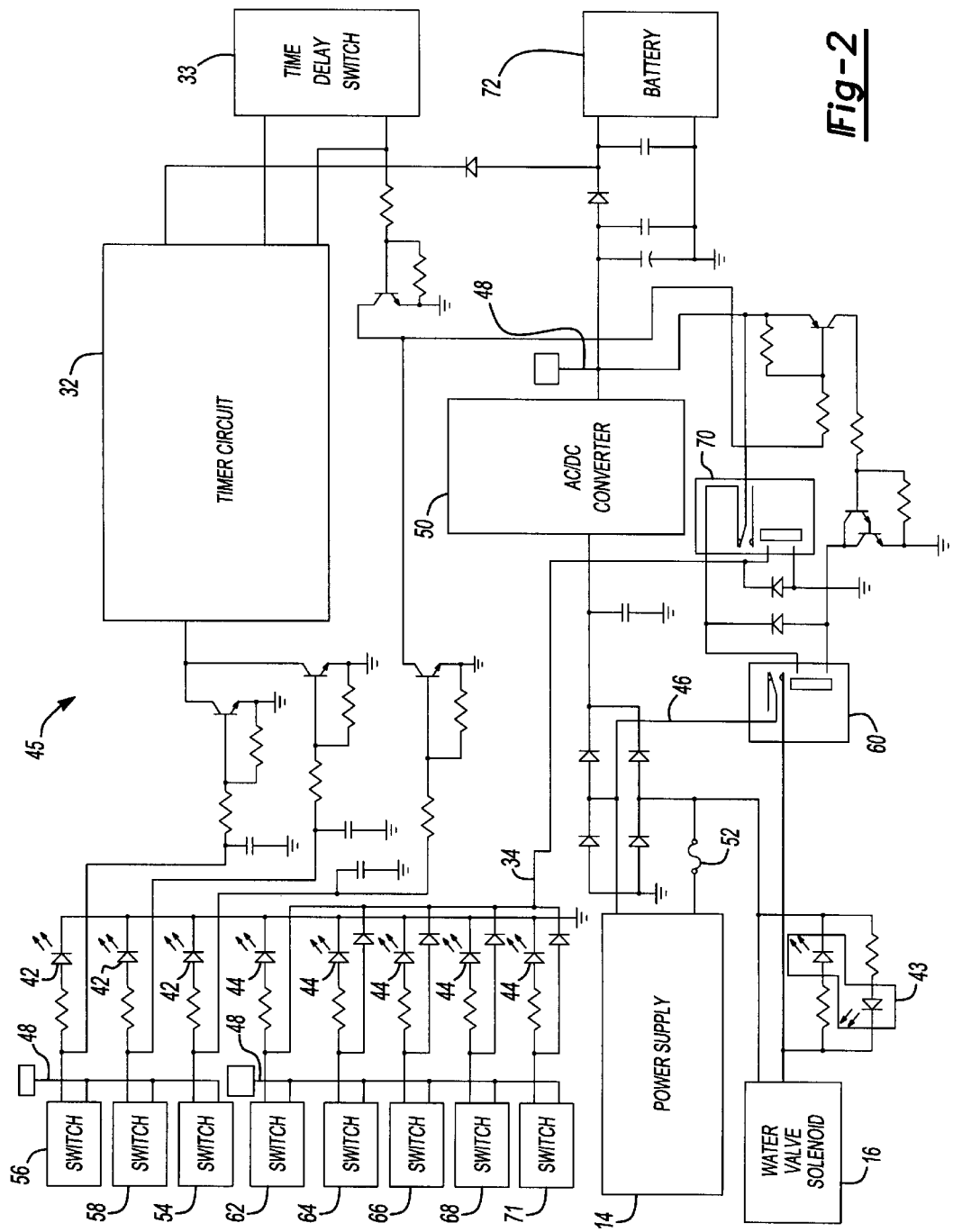
FIG. 2 is a schematic of a building systems interface used by the water leak mitigation system of the present invention.

An exemplary circuit diagram of the operation of system 10 is shown in FIG. 2 at 45. Power supply 14 provides power to a power leg 46 and a switching leg 48 of the circuit 45. Power supply 14 is preferably in the form of a 24V AC power supply as the power leg 46 requires AC voltage. However, power supply 14 may take the form of any suitable power source, such as a cell battery or a DC power supply equipped with a DC-AC converter 50. Further, fuses 52 may be provided to protect the circuit from power surges or other electrical malfunctions.

When open, primary input switch 54 associated with wall switch 18, primary input switch 56 associated security system 20, and primary input switch 58 associated with smart home system 22 prevent power flow to activation relay 60. When any one of the primary input switches 54, 56, or 58 receive a primary input to activate, the particular switch 54, 56, or 58 is closed. The closure of switch 54, 56, or 58 directs power to activation relay 60 thereby causing the activation relay 60 to trip and permit power from the power leg 46 to energize and close the water control valve 16. Primary LED's 42 visually indicate which primary input switch is activated.

When the primary input is from the security system 20 or the smart home system 22, timer 32 may be used to delay the transfer of current from switch 56, 58 to relay 60, thus delaying the energizing of valve 16. The period of time for which the current is delayed may be set to any suitable period of time according to user preference and the capabilities of the particular timer 32 used. The duration of the timer 32 may be altered by way of a variable time delay switch 33. Any suitable timer 32 as is known to those skilled in the art may be used to provide the delay function.

A bypass circuit 34 is provided to process the above described secondary inputs. When a secondary input is received from water dependent peripheral systems 24, 26, 28, 30, and/or 31, a corresponding switch is activated. Specifically, irrigation system 24 activates switch 62, sump pump system 26 activates switch 64, baseboard heat system activates switch 66, water softener system activates switch 68 and fire suppression 31 actuates switch 71. Activation of any switch 62, 64, 66, 68 or 71 causes the bypass relay 70 to trip, which causes power to bypass switches 54, 56, and 58. When bypass 34 is activated, the activation relay 60 resets, and the valve 16 de-energizes so as to permit water flow to the associated building. An LED 43 visually indicates that the power leg portion of the circuit is active. Secondary LED's 44 visually indicate which secondary input switch resulted in the activation of the bypass circuit.

After the secondary input ceases, the bypass 34 and relay 70 both deactivate. If switches 54, 56, or 58 are active, the relay 60 will again activate and cause valve 16 to be energized. If switches 54, 56, or 58 are not active then relay 60 will not be activated and valve 16 will not be energized, thus permitting water to flow to the associated building.

A battery backup circuit 72 is provided to maintain logic control in the event of main power loss. Should the building lose power, the circuit will maintain logic control so that when power is restored, the water control valve will return to the proper state.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A water leak mitigation system comprising:
   a building systems interface;
   a plumbing interface;
   a monitoring device that produces a primary input to said building systems interface in response to a command to restrict water flow; and
   an automated building peripheral system that produces a secondary input which is transmitted to said building systems interface when said peripheral system requires water for operation;
   wherein said building systems interface directs said plumbing interface to restrict water flow in response to receipt of said primary input and said building systems interface, upon receipt of said secondary input, directs said plumbing interface to resume said water flow to said building peripheral system overriding said primary input in response to receipt of said secondary input and upon the discontinuance of said secondary input said building systems interface returns to receiving said primary input.

2. The water leak mitigation system of claim 1, further comprising a power supply for powering said plumbing interface.

3. The water leak mitigation system of claim 1, further comprising a manual control device capable of producing said primary input for receipt by said building interface device.

4. The water leak mitigation system of claim 1, wherein said monitoring device is a smart home system.

5. The water leak mitigation system of claim 1, wherein said monitoring device is a security system.

6. The water leak mitigation system of claim 1, wherein said peripheral system is selected from a group consisting of an irrigation system, a sump pump system, a baseboard heat system, a water softener system, a fire suppression system, or any combination thereof.

7. The water leak mitigation system of claim 1, further comprising a timer for delaying said restriction of said water flow.

8. A water leak mitigation system comprising:
   a building systems interface;
   a plumbing interface;
   a manual control device that produces a primary input for receipt by said building system device;
   an automated building peripheral system that produces a secondary input which is transmitted to said building systems interface;
   wherein said building systems interface directs said plumbing interface to restrict water flow in response to receipt of said primary input and said building systems interface, upon receipt on said secondary input, directs said plumbing interface to resume said water flow to said building peripheral system overriding said primary input in response to receipt of said secondary input and upon the discontinuance of said secondary input said building systems interface returns to receiving said primary input.

9. The water leak mitigation system of claim 8, further comprising a monitoring device that produces said primary input to said building systems interface in response to a command to restrict water flow.

10. The water leak mitigation system of claim 9, wherein said monitoring device is a smart home system.

11. The water leak mitigation system of claim 9, wherein said monitoring device is a security system.

12. The water leak mitigation system of claim 8, wherein said peripheral system is selected from a group consisting of an irrigation system, a sump pump system, a baseboard heat system, a water softener system, a fire suppression system, or any combination thereof.

13. The water leak mitigation system of claim 8, further comprising a timer for delaying said restriction of said water flow.

14. A method for mitigating a water leak comprising:
   transferring a primary input from a monitoring device to a building systems interface in response to a command to restrict water flow;
   transferring a secondary input from an automated building peripheral system to said systems interface when said peripheral system requires water for operation;
   using said building systems interface to instruct a plumbing interface to restrict a water flow in response to receipt of said primary input; and
   using said building systems interface to instruct said plumbing interface to resume said water flow to said building peripheral system in response to receipt of said secondary input overriding said primary input in response to receipt of said secondary input; and
   returning to receipt of said primary input upon removal of said secondary input.

15. The method for mitigating a water leak of claim 14, further comprising transferring said primary input from a manual control device to said building systems interface.

16. The method for mitigating a water leak of claim 14, wherein said monitoring device is a smart home system.

17. The method for mitigating a water leak of claim 14, wherein said monitoring device is a security system.

18. The method for mitigating a water leak of claim 14, wherein said peripheral system is selected from a group consisting of an irrigation system, a sump pump system, a baseboard heat system, a water softener system, a fire suppression system, or any combination thereof.

19. The method for mitigating a water leak of claim 14, further comprising delaying said restriction of said water flow using a timer.

* * * * *